US 10,131,084 B2

(12) United States Patent
Galt et al.

(10) Patent No.: US 10,131,084 B2
(45) Date of Patent: Nov. 20, 2018

(54) METHOD OF TRANSFERRING A MOLDED ARTICLE

(71) Applicant: Husky Injection Molding Systems Ltd., Bolton (CA)

(72) Inventors: John Robert Galt, Nobleton (CA); Bruno Giuseppe Sodaro, Cambridge (CA); Alex Teng, Richmond Hill (CA); Robin Wade Lovell, Oakville (CA); Ralf Schmitz, Hülzweiler (DE)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 807 days.

(21) Appl. No.: 14/401,538

(22) PCT Filed: May 7, 2013

(86) PCT No.: PCT/CA2013/050352
§ 371 (c)(1),
(2) Date: Nov. 17, 2014

(87) PCT Pub. No.: WO2013/173918
PCT Pub. Date: Nov. 28, 2013

(65) Prior Publication Data
US 2015/0130113 A1 May 14, 2015

Related U.S. Application Data

(60) Provisional application No. 61/651,289, filed on May 24, 2012.

(51) Int. Cl.
*B29C 49/70* (2006.01)
*B29C 45/40* (2006.01)
(Continued)

(52) U.S. Cl.
CPC ............. *B29C 49/70* (2013.01); *B25J 9/16* (2013.01); *B25J 11/00* (2013.01); *B29C 45/40* (2013.01);
(Continued)

(58) Field of Classification Search
CPC .................................................. B29C 49/70
See application file for complete search history.

(56) References Cited

U.S. PATENT DOCUMENTS 5,653,934 A * 8/1997 Brun, Jr. ............... B29C 33/30
264/334
6,848,900 B2 2/2005 Romanski et al.
(Continued)

FOREIGN PATENT DOCUMENTS

EP 0872329 A1 10/1998
WO 2011063499 A1 6/2011

OTHER PUBLICATIONS

International Search Report, 3 Pages.
European Search Report, dated Apr. 25, 2016, 7 pages.

*Primary Examiner* — Larry W Thrower

(57) ABSTRACT

Disclosed herein, amongst other things, is a method of transferring a molded article from a moveable mold half of a mold into a receptacle of a post-mold tool. The method includes positioning the moveable mold half relative to the post-mold tool to position the molded article thereon closer to the receptacle and retracting the moveable mold half while simultaneously extending a stripping device to eject the molded article from the moveable mold half and to transfer it into the receptacle.

7 Claims, 14 Drawing Sheets

(51) Int. Cl.
  *B29C 45/42* (2006.01)
  *B25J 9/16* (2006.01)
  *B25J 11/00* (2006.01)
  *B29C 49/78* (2006.01)

(52) U.S. Cl.
  CPC .......... *B29C 45/4225* (2013.01); *B29C 49/78* (2013.01); *B29C 2049/701* (2013.01); *B29C 2949/7884* (2013.01); *B29C 2949/78563* (2013.01)

(56) References Cited

U.S. PATENT DOCUMENTS

| | | | |
|---|---|---|---|
| 2004/0009258 A1 | 1/2004 | Romanski et al. | |
| 2006/0068049 A1* | 3/2006 | Nishizawa | B29C 45/76 425/145 |
| 2008/0268081 A1 | 10/2008 | McCready | |
| 2008/0268087 A1* | 10/2008 | McCready | B29C 45/7207 425/526 |
| 2011/0111079 A1 | 5/2011 | McCready | |

* cited by examiner

METHOD OF TRANSFERRING A MOLDED ARTICLE

TECHNICAL FIELD

Non-Limiting embodiments disclosed herein generally relate to a method of transferring a molded article and a controller of a molding system including instructions for implementing the method.

SUMMARY OF THE INVENTION

A general aspect disclosed herein is to provide a method of transferring a molded article from a moveable mold half of a mold into a receptacle of a post-mold tool. The method includes positioning the moveable mold half relative to the post-mold tool to position the molded article thereon closer to the receptacle and retracting the moveable mold half while simultaneously extending a stripping device to eject the molded article from the moveable mold half and to transfer it into the receptacle.

Another general aspect disclosed herein is to provide a controller including instructions being embodied in a controller-usable memory of the controller, the instructions for directing the controller to control a molding system to execute a method of transferring a molded article from a moveable mold half of a mold into a receptacle of a post-mold tool. The method includes positioning the moveable mold half relative to the post-mold tool to position the molded article thereon closer to the receptacle and retracting the moveable mold half while simultaneously extending a stripping device thereof to eject the molded article from the moveable mold half and to transfer it into the receptacle.

These and other aspects and features of non-limiting embodiments will now become apparent to those skilled in the art upon review of the following description of specific non-limiting embodiments of the invention in conjunction with the accompanying drawings.

DETAILED DESCRIPTION OF THE DRAWINGS

The non-limiting embodiments will be more fully appreciated by reference to the accompanying drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE EMBODIMENT(S)

Reference will now be made in detail to various non-limiting embodiment(s) of a molding system and a related method of transferring a molded article from a moveable mold half of a mold into a receptacle of a post-mold tool. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Figure 1:
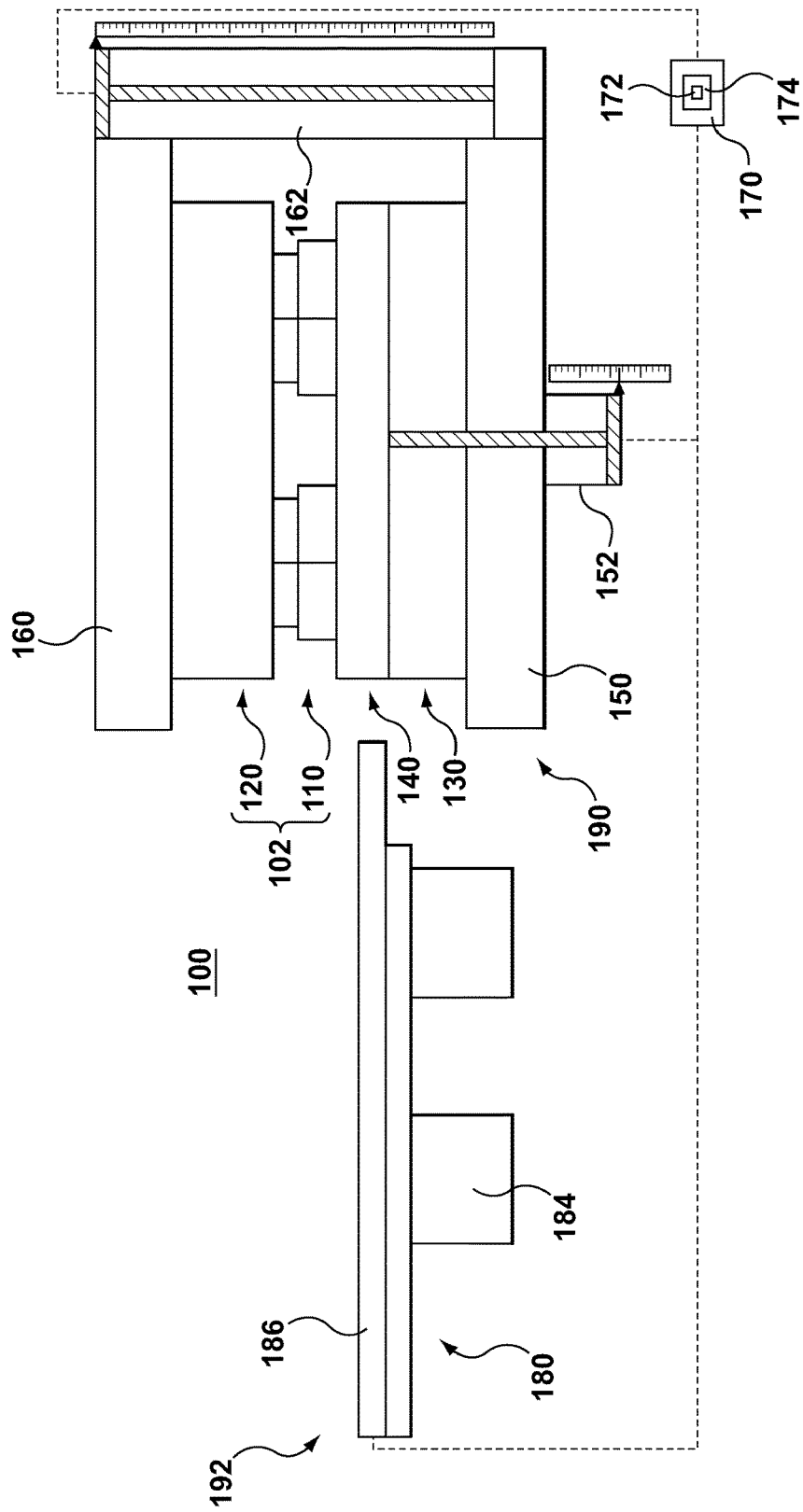
FIGS. 1-13 depict a schematic representation of a molding system in accordance with a first non-limiting embodiment through various stages of execution of a non-limiting embodiment of a method of transferring a molded article from a mold to a post-mold tool.

With reference to FIG. 1, there is depicted a schematic representation of a non-limiting embodiment of a molding system 100 that has been configured for the production of molded articles (not shown) such as, for example, preforms of the type for blow molding into containers (not shown). The molding system 100 broadly includes a mold clamp 190 for selectively clamping a mold 102 therein, a post-mold device 192 for retrieving molded articles (not shown) from the mold 102, and a controller 170 for controlling various actuators that are associated with the molding system 100. The structure and operation of the molding system 100 is generally consistent with the state of the art and hence a detailed description thereof has been omitted herein.

For the purposes of this description it suffices to illustrate that the mold clamp 190 includes a moveable platen 150, a stationary platen 160 and a platen actuator 162 such as, for example, a hydraulic or electro-mechanical actuator, linking the two together. That being said, those of skill in the art will appreciate that the representation of the mold clamp 190 has been simplified and that not all of the structures thereof have been illustrated. In operation, the platen actuator 162 is selectively operable, under the control of the controller 170, to selectively move the moveable platen 150 relative to the stationary platen 160 and hence move a moveable mold half 110 relative to a stationary mold half 120 that are associated therewith, respectively. In addition, the mold clamp 190 includes an ejector actuator 152 such as, for example, a hydraulic or electro-mechanical actuator, that links the moveable platen 150 to a stripping device 140 of the moveable mold half 110. In operation, the ejector actuator 152 is selectively operable, under the control of the controller 170, to selectively move the stripping device 140 relative to a core assembly 130 of the moveable mold half 110 for ejecting molded articles (not shown) from the moveable mold half 110.

For the purposes of this description it also suffices to illustrate that the post-mold device 192 includes a post-mold tool 180, such as, for example, an end-of-arm tool, that is linked to a carrier actuator 186 such as, for example, a servo motor. That being said, those of skill in the art will appreciate that the representation of the post-mold device 192 has been simplified and that not all of the structures thereof have been illustrated. In operation, the carrier actuator 186 is selectively operable, under the control of the controller 170, to selectively move the post-mold tool 180 relative to the mold 102 for retrieving the molded articles (not shown) therefrom. In particular, the post-mold tool 180 is shown to include a set of receptacles 184 within which to receive a set of molded articles received from the mold. The post-mold device 180 may further include further sets of receptacles (not shown) for holding multiple sets of molded articles. That is, it is well known in the art to configure the post-mold tool 180 to include multiple sets of receptacles for sake of holding molded articles therein over a duration of multiple molding cycles for enhancing the thermal conditioning (e.g. cooling) thereof. That being said, the number of sets of receptacles that are associated with the post-mold tool 180 is not particularly limited.

Figure 14:
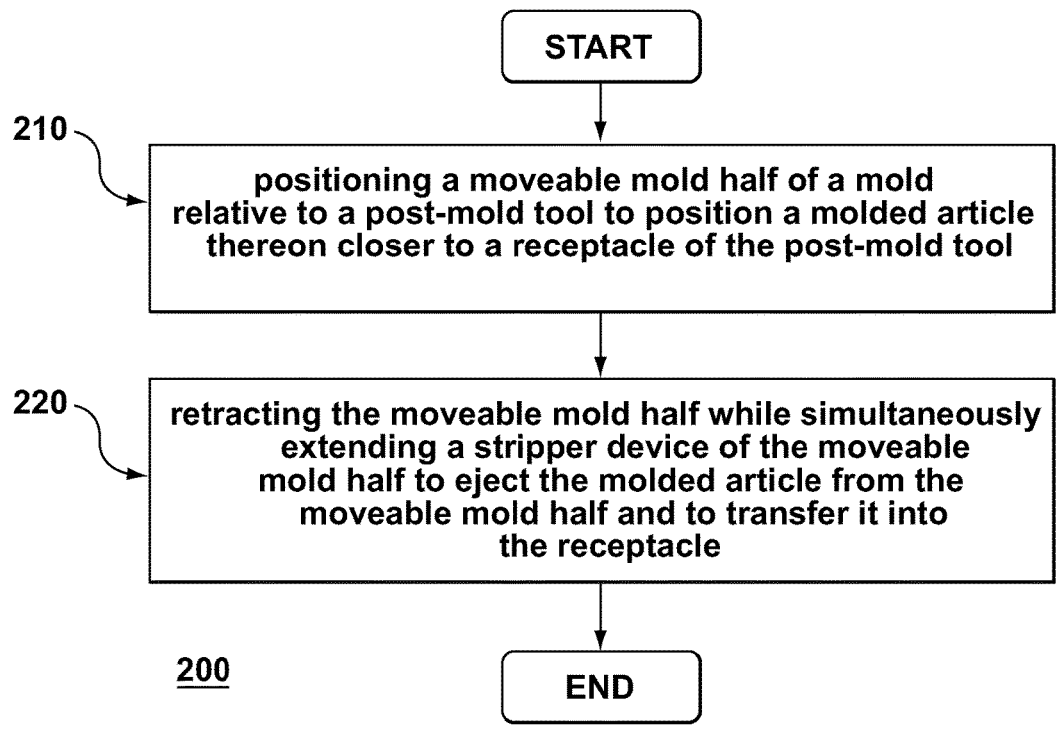
FIG. 14 depicts a flow chart of the method of transferring the molded article from the mold into the post-mold tool.

Lastly, for the purposes of this description it suffices to illustrate that the controller 170 is controllably linked to the ejector actuator 152, the platen actuator 162, and the carrier actuator 186 for control thereof in accordance with instructions 172 that are retained in a controller-usable memory 174 of the controller 170. That being said, those of skill in the art will appreciate that the representation of the controller 170 has been simplified and that not all of the structures thereof have been illustrated. In operation, the instructions 172 direct the controller 170 to execute a method 200 (FIG. 14) of transferring a molded article 104 (FIG. 3) from the mold 102 into a receptacle 184 (FIG. 3) that is associated with the post-mold tool 180.

Step 210

Broadly speaking, the method 200 (FIG. 14) begins with a step 210 of positioning the moveable mold half 110 relative to the post-mold tool 180 to position the molded article 104 closer to the receptacle 184.

Figure 2:
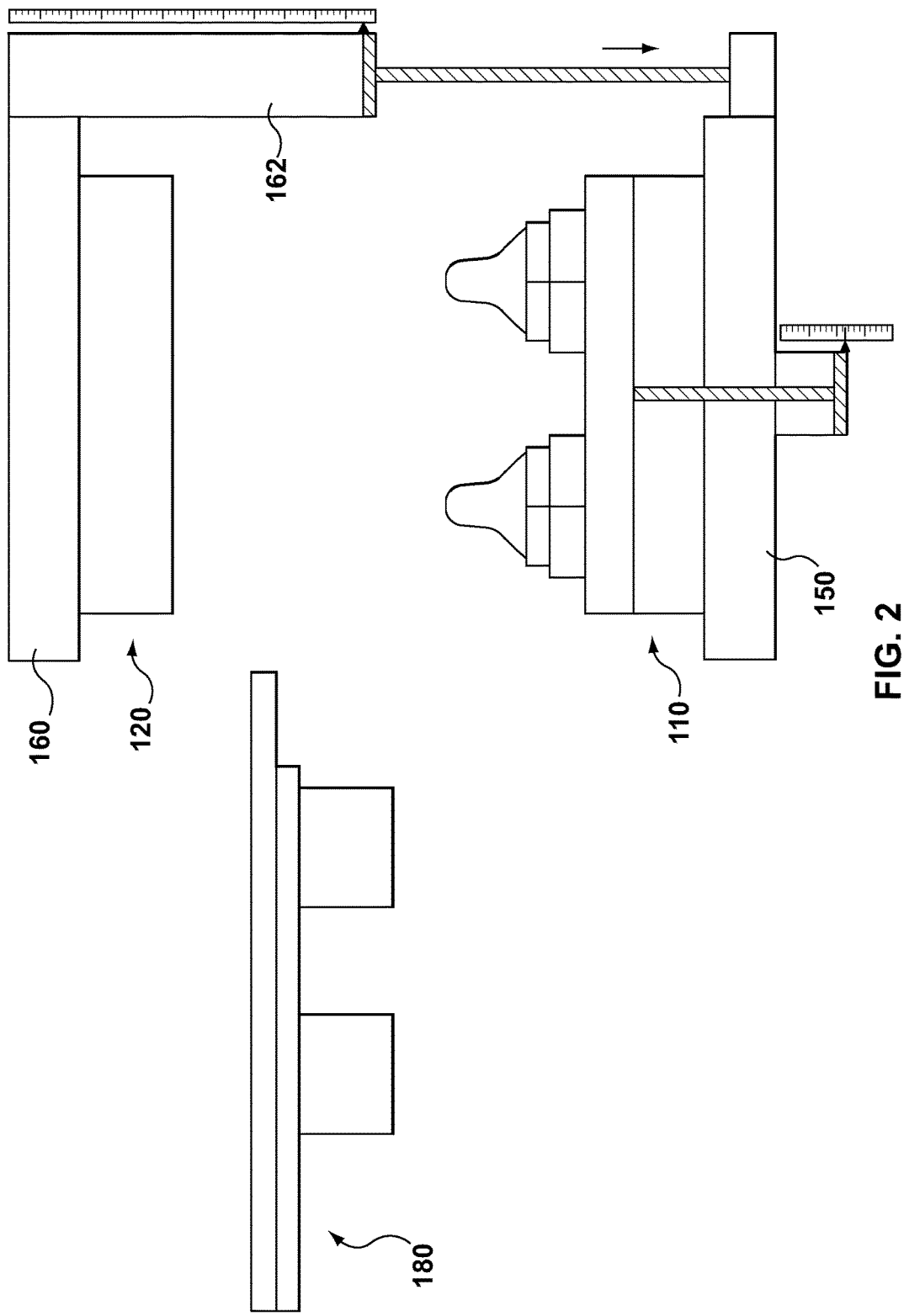
Figure 3:
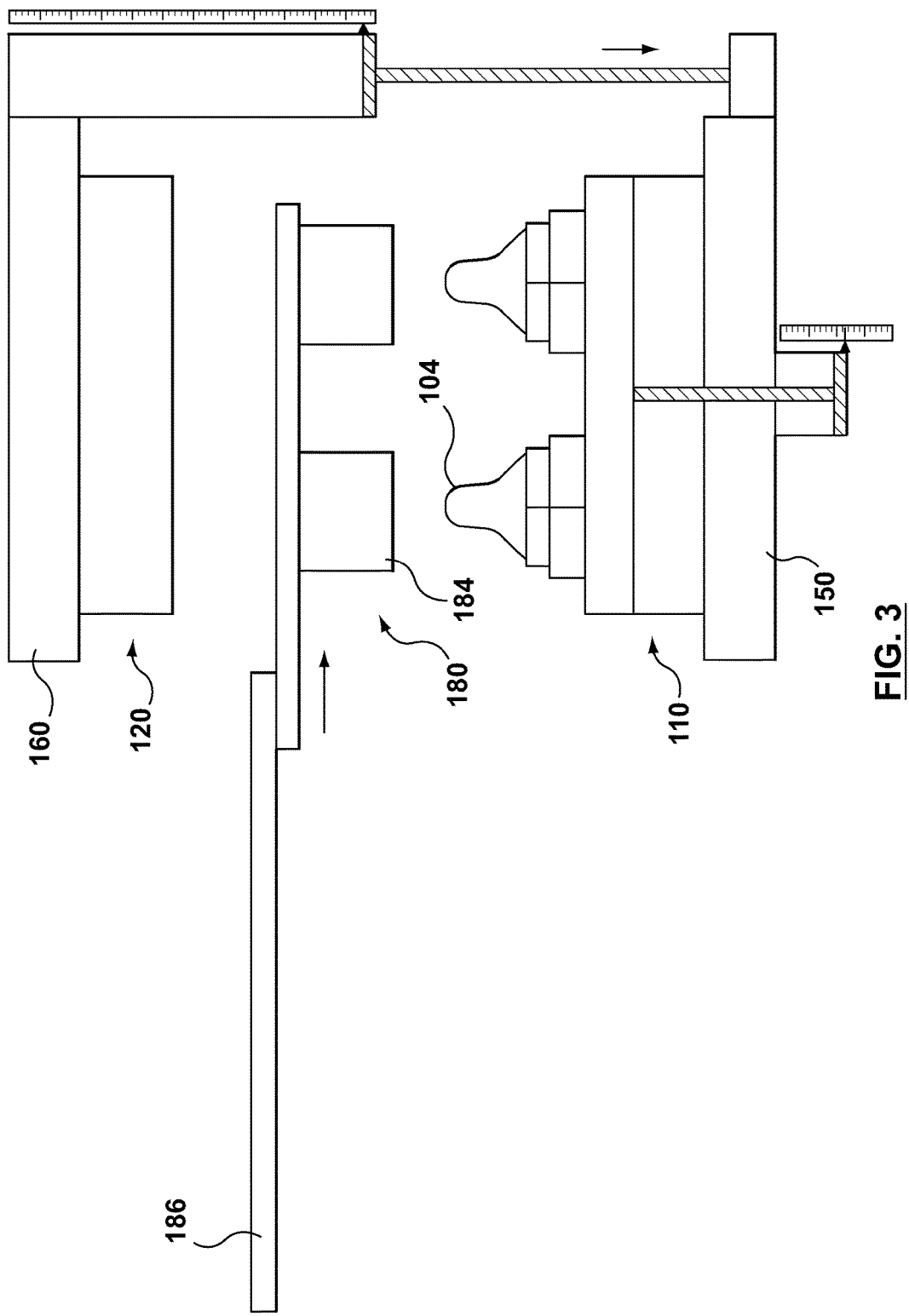
Figure 4:
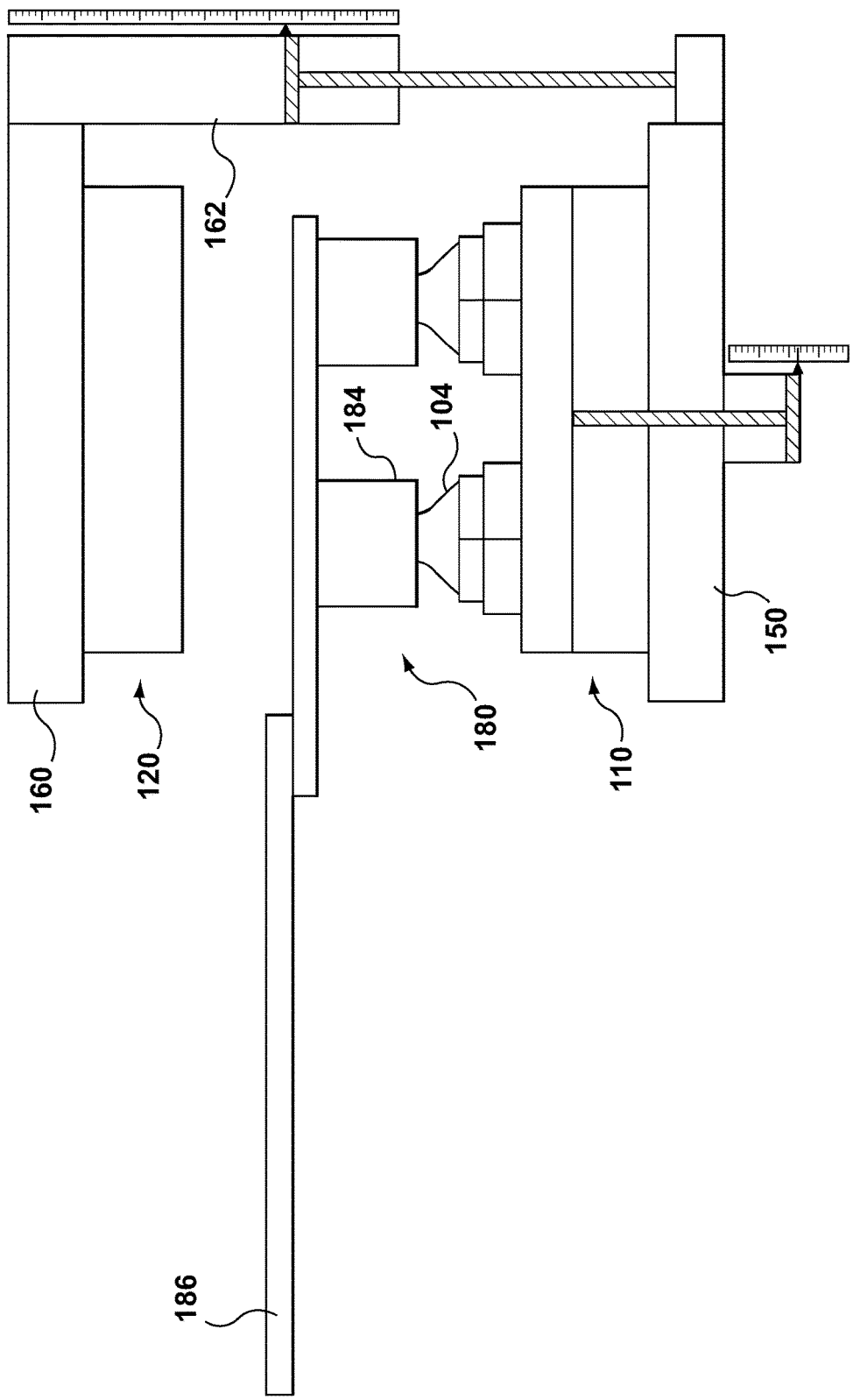

To illustrate a non-limiting example of an execution of the foregoing step 210 reference shall now be made to FIGS. 2-4.

In particular, and with reference to FIG. 2, the step 210 may begin with an operation of separating the moveable mold half 110 from the stationary mold half 120. The foregoing involves controlling the platen actuator 162 to reposition the moveable platen 150 away from the stationary platen 160. In so doing, the mold 102 is opened sufficiently that there is enough space for the post-mold tool 180 to enter in between the moveable mold half 110 and the stationary mold half 120.

Next, and as shown with reference to FIG. 3, the step 210 may further include an operation of positioning the post-mold tool 180 into a receiving position that is between the moveable mold half 110 and the stationary mold half 120 with the receptacles 184 thereof in alignment with the molded articles 104 that are resident on the moveable mold half 110. The foregoing operation involves controlling the carrier actuator 186 to position the post-mold tool 180.

Next, and as shown with reference to FIG. 4, the step 210 may end with an operation of positioning the moveable mold half 110 closer to the post-mold tool 180 to cause the molded articles 104 that are resident on the moveable mold half 110 to be positioned closer to the receptacles 184. More particularly, the molded articles 104 may be positioned within the receptacles 184. The foregoing step involves controlling the platen actuator 162 to position the moveable platen 150 towards the stationary platen 160.

Step 220

Broadly speaking, the method 200 (FIG. 14) ends or repeats with a step 220 of retracting 220 the moveable mold half 110 while simultaneously extending a stripping device 140 thereof to eject the molded article 104 from the moveable mold half 110 and to transfer it into the receptacle 184.

To illustrate a non-limiting example of an execution of the foregoing step 220 reference shall now be made to FIGS. 5-9.

Figure 5:
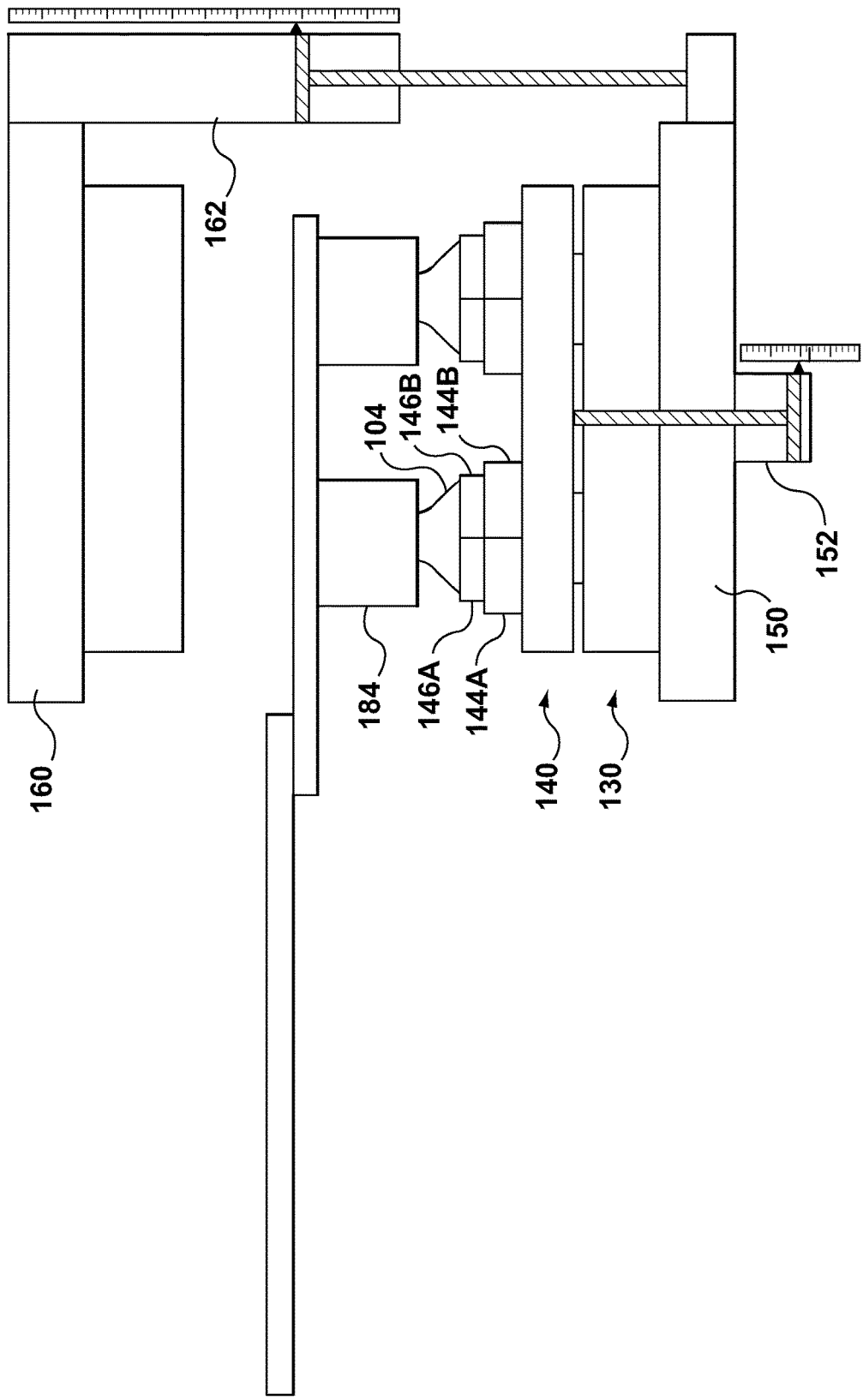

In particular, and with reference to FIG. 5, the step 220 may begin with a first stage of ejection of the molded articles 104 from the moveable mold half wherein the core assembly 130 thereof has been retracted a short distance relative to the stripping device 140 that remains substantially stationary relative to the post-mold tool 180 by virtue of the coordinated control of the ejector actuator 152 and the platen actuator 162. More particularly, the stripping device 140 has been extended with substantially equal and opposite movement to retraction of the core assembly 130 of the moveable mold half 110 such that the stripping device 140 remains substantially stationary relative to the post-mold tool 180 as it ejects the molded article 104 from the moveable mold half 110. The foregoing step is a prelude to the opening of a pair of slides 144A, 144B that are slidably linked to the stripping device 140 for opening of a pair of split inserts 146A, 146B that are connected thereto for releasing an encapsulated portion 105 (FIG. 6) of the molded articles 104.

Figure 6:
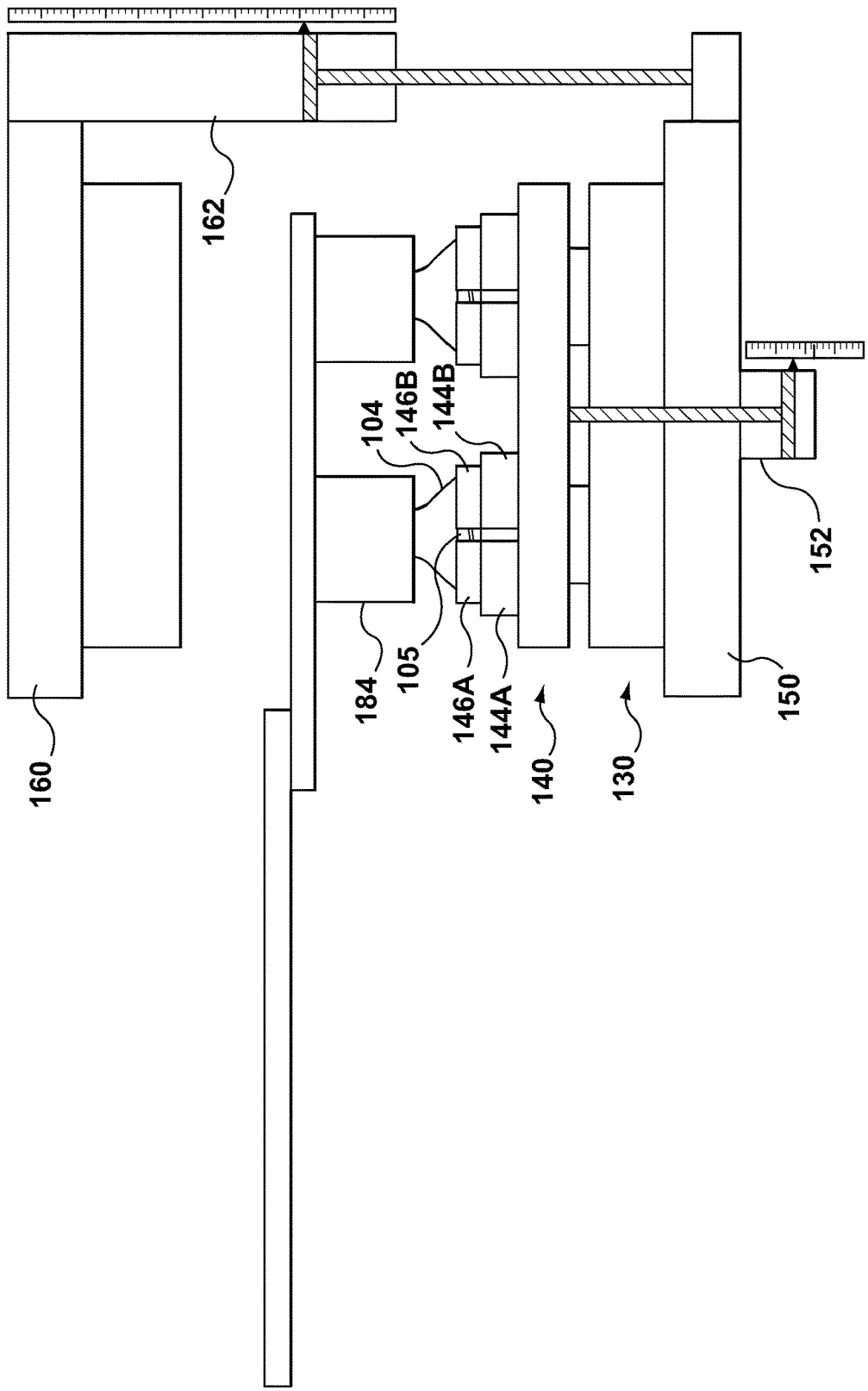
Figure 7:
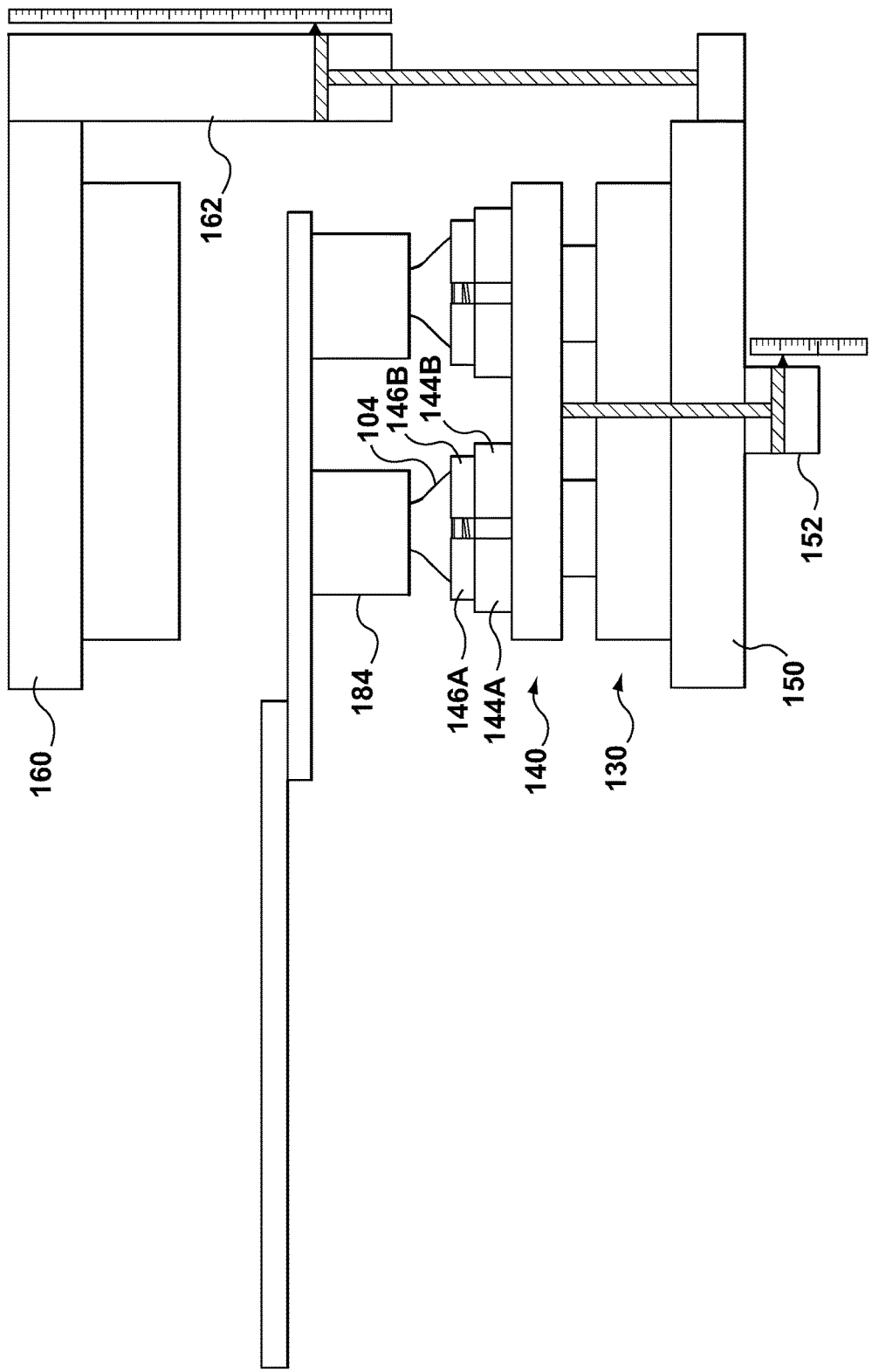
Figure 8:
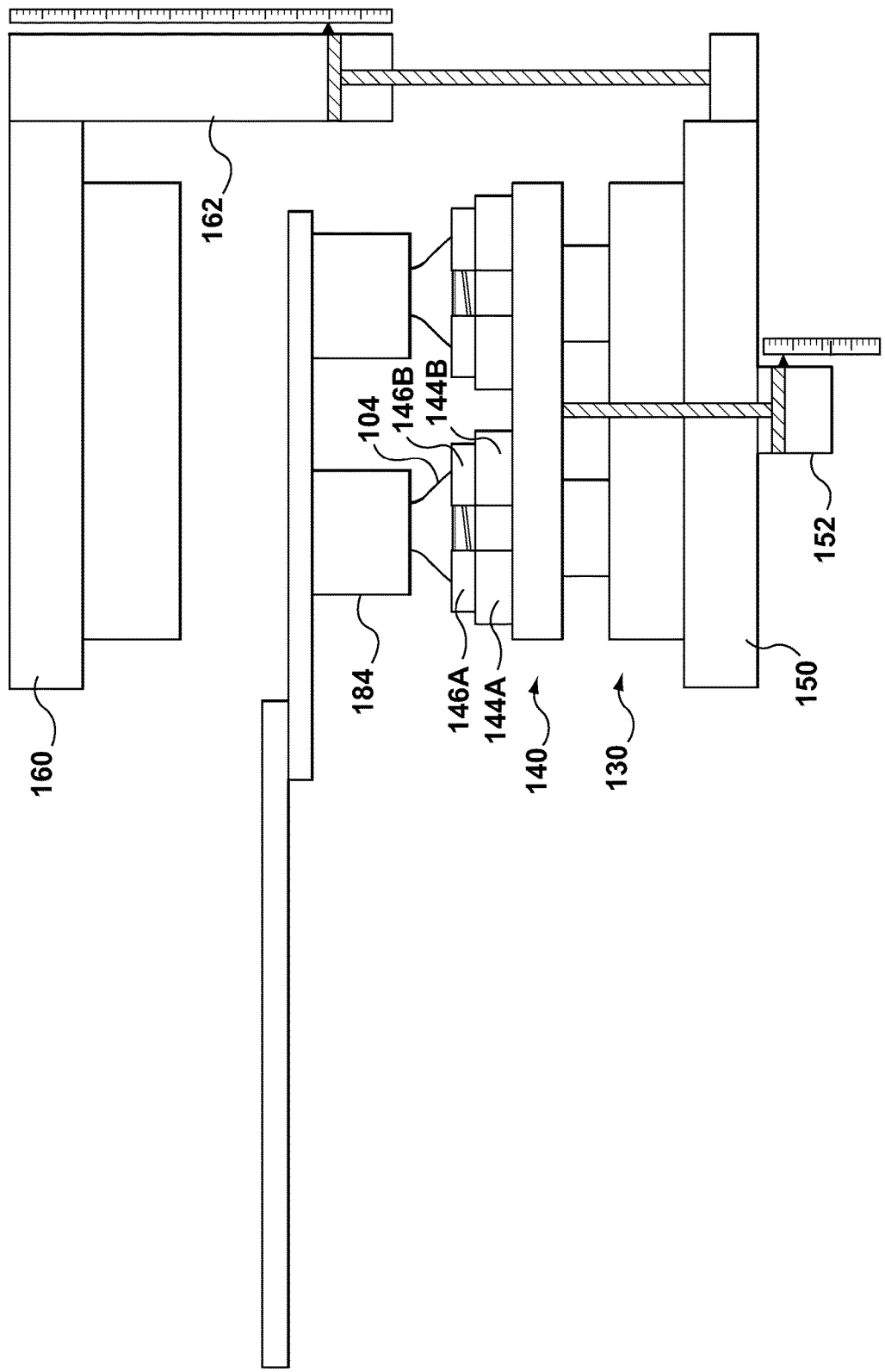

With reference FIGS. 6, 7 and 8 a second stage of ejection of the molded articles 104 is progressively completed, wherein the pair of slides 144A, 144B are opened (i.e. laterally moved apart) to open (i.e. space apart) the split inserts 146A, 146B to fully release the encapsulated portion 105 (FIG. 6) of the molded articles 104 therefrom. The foregoing step again involves effectively retracting the core assembly 130 a further distance relative to the stripping device 140 that remains substantially stationary relative to the post-mold tool 180 by virtue of the coordinated control of the ejector actuator 152 and the platen actuator 162. In so doing, a cam (not shown) that links the pair of slides 144A, 144B to the core assembly 130 drives the opening thereof. That being said, the means by which the pair of slides 144A, 144B are actuated (i.e. opened and closed) is not so limited and may otherwise be actuated, for example, by one or more linear actuators that are associated with the stripping device 140.

Figure 9:
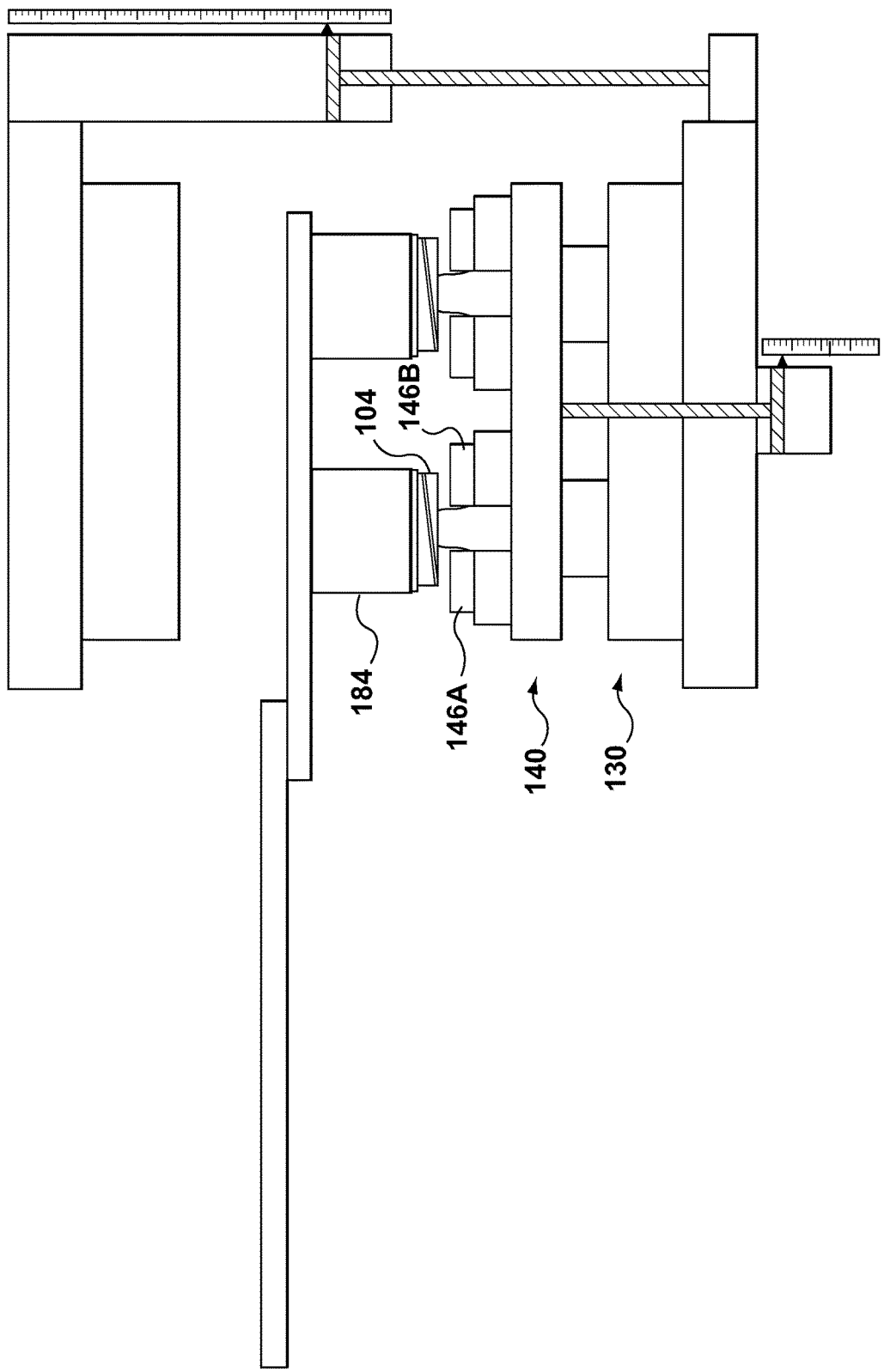

As shown with reference to FIG. 9, once the molded articles 104 have been ejected from the moveable mold half 110 they are received in the receptacles 184 by virtue of the activation of vacuum structures (not shown) that are associated therewith. In so doing the molded articles 104 are moved clear of the split inserts 146A, 146B.

Figure 10:
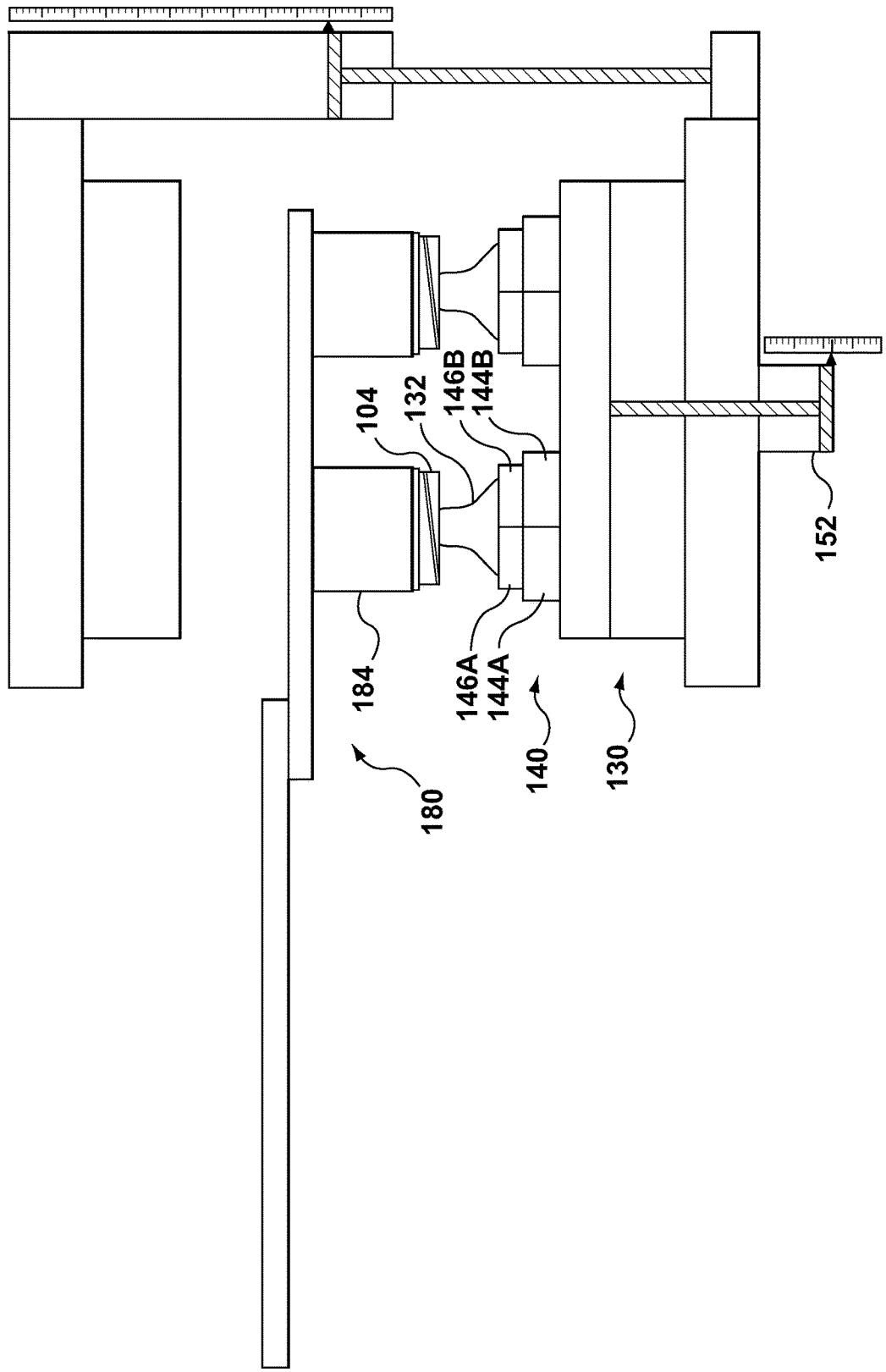

As shown with reference to FIG. 10, the non-limiting embodiment of the method 200 (FIG. 14) may further include retracting the stripping device 140. The foregoing step involves controlling the ejector actuator 152 to retract the stripping device 140 towards the core assembly 130.

Figure 11:
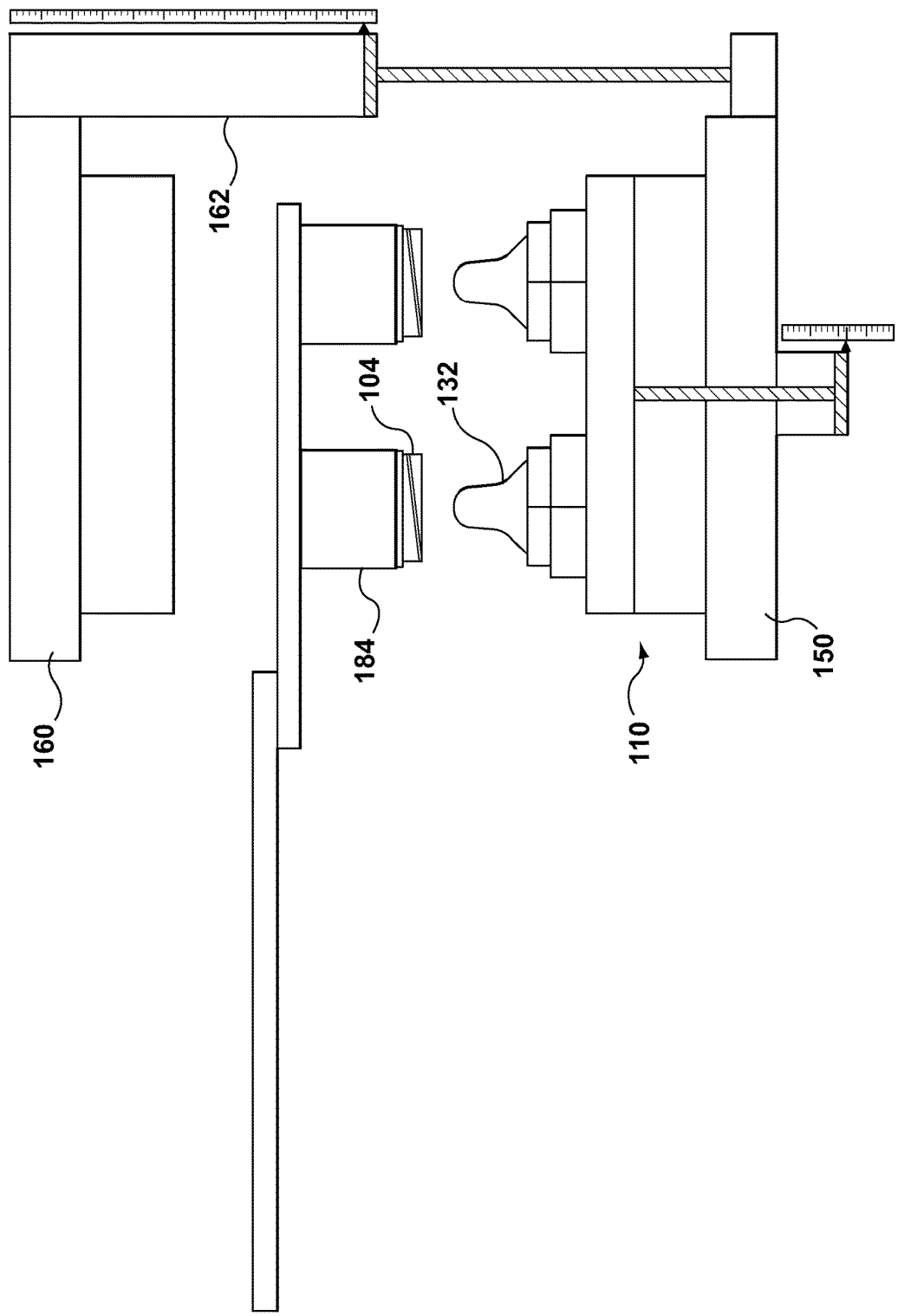

As may also be appreciated, once the molded articles 104 have been received in the receptacles 184 core inserts 132 of the core assembly 130 on which the molded articles 104 were molded may still protrude through open ends thereof. As such, with reference to FIG. 11, the method 200 (FIG. 14) may also further include retracting the moveable mold half 110 relative to the post-mold tool 180 to withdraw the core inserts 132 from the molded articles 104 that are now resident in the receptacles 184. The foregoing step involves controlling the platen actuator 162 to reposition the moveable platen 150 away from the stationary platen 160.

Figure 12:
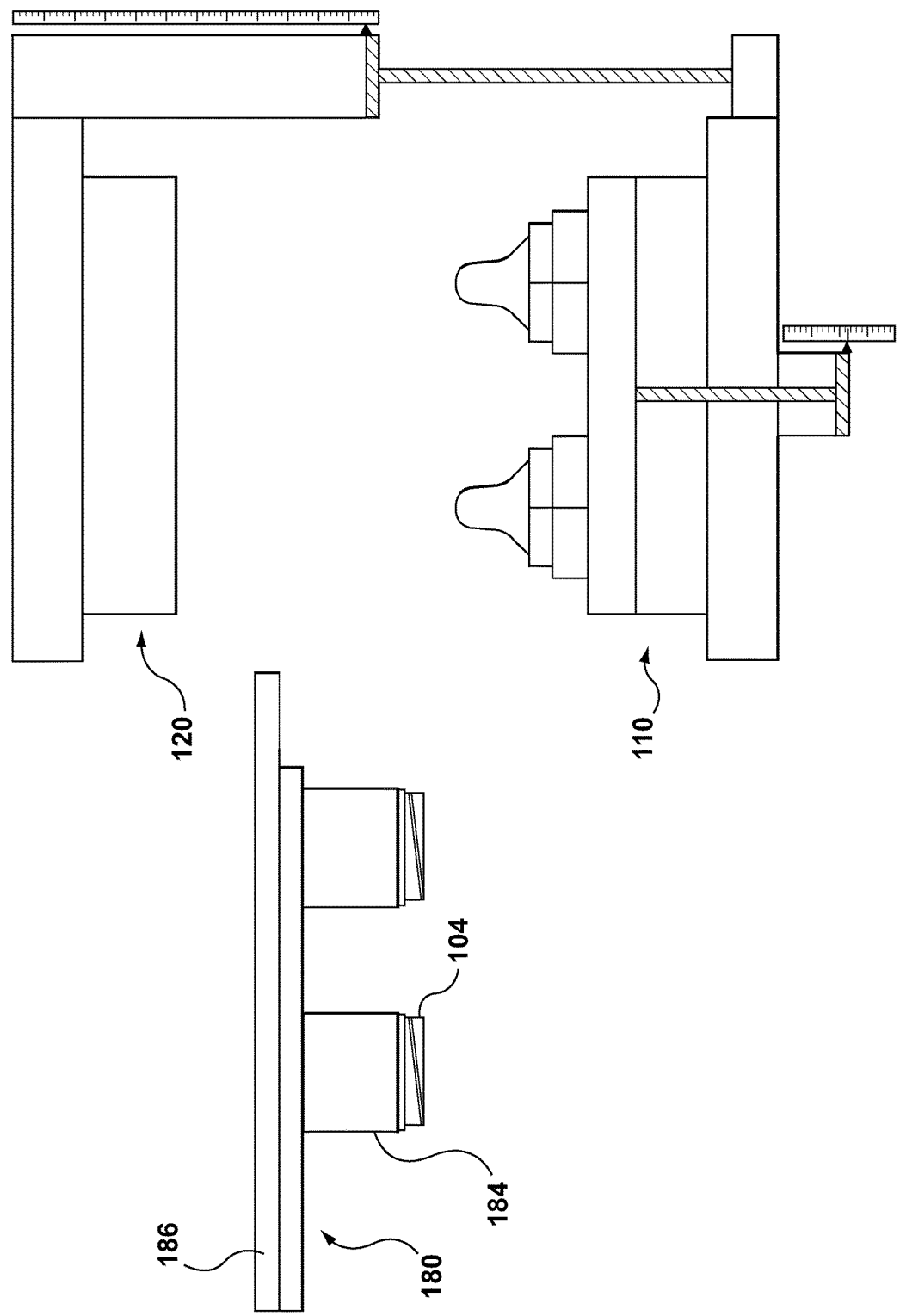

As shown with reference to FIG. 12, the method 200 (FIG. 14) may further include positioning the post-mold tool 180 into a transfer position with the withdrawal thereof from between the moveable mold half 110 and the stationary mold half 120 with the molded articles 104 in the receptacles 184. The foregoing step involves controlling the carrier actuator 186 to withdraw the post-mold tool 180.

Figure 13:
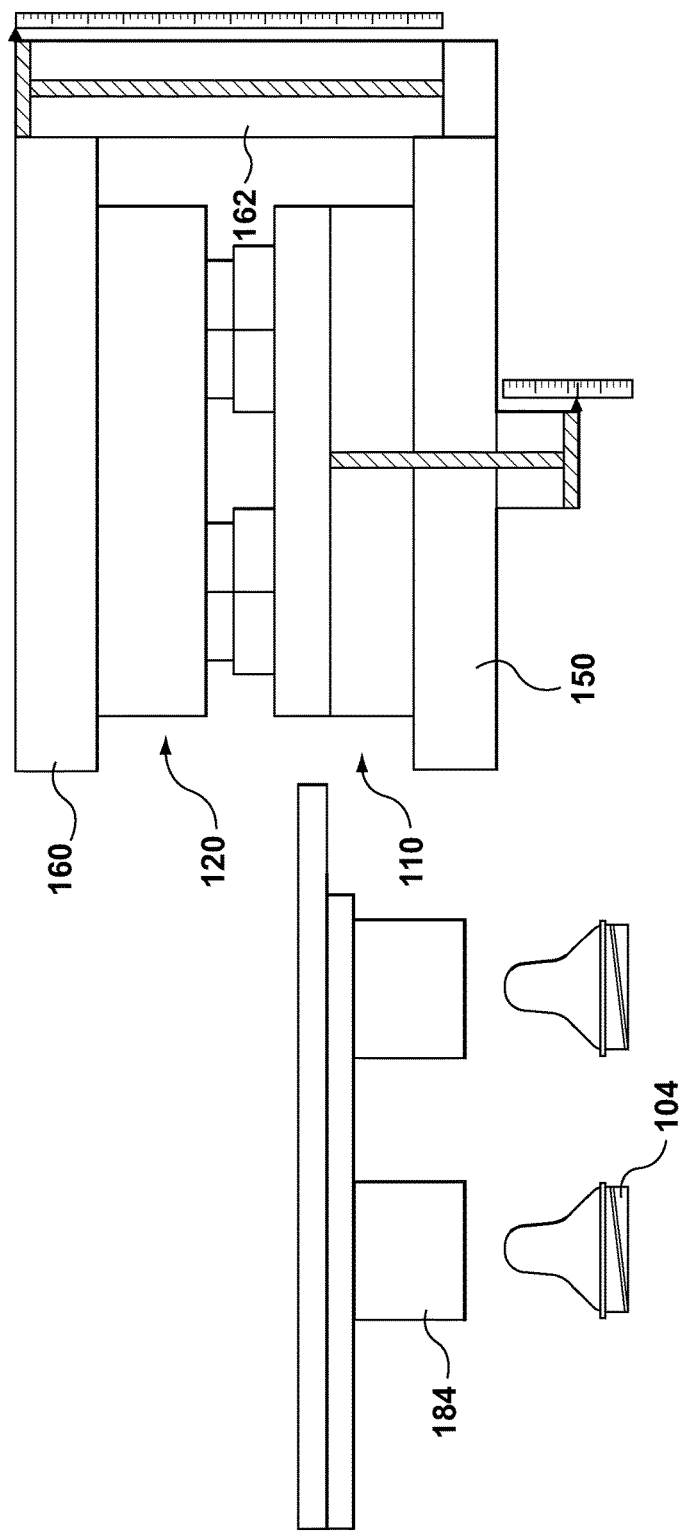

As shown with reference to FIG. 13, the method 200 (FIG. 14) may include closing the mold 102 for sake of being positioned to mold the next batch of molded articles. The foregoing step involves controlling the platen actuator 162 to reposition the moveable platen towards from the stationary platen 160. The method 200 may lastly include the ejecting of the molded articles 104 from the receptacles 184. The foregoing step involves controlling an ejector (not shown) that is associated with the receptacles 184 to eject the molded articles 104 therefrom.

A technical effect of the foregoing method 200 may include more reliable transfer of the molded articles 104 from the moveable mold half 110 to the receptacles of the post-mold tool 180 by virtue of the positioning of the molded article 104 closer to the receptacles 184 prior to the ejection thereof.

It is noted that the foregoing has outlined some of the more pertinent non-limiting embodiments. It will be clear to those skilled in the art that modifications to the disclosed non-embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying the invention in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. A molding system comprising:
    a moveable platen comprising:
        a moveable mold half, and
        a stripping device;
    a platen actuator linked to the moveable platen;
    a post-mold tool comprising:
        a receptacle;
    a carrier actuator linked to the post-mold tool;
    a controller including a controller-usable memory, the controller-usable memory storing instructions for controlling the molding system, the instructions being for controlling the molding system to transfer a molded article from the moveable mold half of a mold into the receptacle of the post-mold tool, the instructions, when executed, causing:
        positioning of the moveable mold half relative to the post-mold tool to position the molded article thereon closer to the receptacle, wherein the positioning further includes:
            controlling the platen actuator to reposition the moveable platen of the molding system away from a stationary platen of the molding system to separate the moveable mold half from a stationary mold half of the mold that are mounted thereto, respectively; and
            controlling the carrier actuator to position the post-mold tool into the receiving position that is between the moveable mold half and the stationary mold half to align the receptacle with the molded article on the moveable mold half;
            controlling the platen actuator to position the moveable platen on which the moveable mold half is mounted to cause insertion of the molded article into the receptacle; and
        controlling the platen actuator to reposition the moveable platen to cause retracting of the moveable mold half while simultaneously extending the stripping device to eject the molded article from the moveable mold half and to transfer it into the receptacle.

2. The molding system of claim 1, wherein the instructions, when executed, cause the retracting the moveable mold half while simultaneously extending the stripping device of the moveable mold half to eject the molded article from the moveable mold half into the receptacle by:
    controlling the platen actuator to move the moveable platen away from the post-mold tool and thereby retract the moveable mold half away from the post-mold tool while simultaneously controlling an ejector actuator to extend the stripping device to eject the molded article from the moveable mold half into the receptacle.

3. The molding system of claim 2, wherein the instructions, when executed, control the platen actuator and the ejector actuator to extend the stripping device with substantially equal and opposite movement to retraction of the moveable mold half such that the stripping device remains substantially stationary relative to the post-mold tool as it ejects the molded article from the moveable mold half.

4. The molding system of claim 3, wherein the instructions, when executed, further cause:
    the ejector actuator to retract the stripping device once the molded article has been ejected from the moveable mold half.

5. The molding system of claim 4, wherein the instructions, when executed, further cause:
    the platen actuator to reposition the moveable platen away from the post-mold tool to withdraw a core insert of a core assembly from the molded article—that is resident in the receptacle.

6. The molding system of claim 5, wherein the instructions, when executed, further cause:
    the carrier actuator to withdraw the post-mold tool to a transfer position with the molded article in the receptacle.

7. The molding system of claim 6, wherein the instructions, when executed, further cause:
    an ejector to eject the molded article from the receptacle.

* * * * *